United States Patent [19]

Ley

[11] Patent Number: 4,626,845

[45] Date of Patent: Dec. 2, 1986

[54] SUBSCRIBER VALIDATION SYSTEM

[75] Inventor: John F. Ley, Countryside, Ill.

[73] Assignee: Epic Systems, Inc., Westchester, Ill.

[21] Appl. No.: 820,599

[22] Filed: Jan. 21, 1986

Related U.S. Application Data

[63] Continuation of Ser. No. 470,498, Feb. 28, 1983, abandoned.

[51] Int. Cl.$^4$ ................................................ G08B 7/00
[52] U.S. Cl. ............................. 340/825.48; 178/70 R;
178/22.08; 340/825.34; 455/7; 379/188
[58] Field of Search .................. 178/70 R; 179/170 R,
179/170 C, 170 F; 455/7, 9, 26; 340/825.3,
825.31, 825.35, 825.48, 825.34; 370/97

[56] References Cited

U.S. PATENT DOCUMENTS

| | | | |
|---|---|---|---|
| 3,939,417 | 2/1976 | Camalte et al. | 455/9 |
| 3,973,087 | 8/1976 | Fong | 179/170 R |
| 4,471,352 | 9/1984 | Soulliard et al. | 340/825.48 X |

OTHER PUBLICATIONS

Brochure entitled "Subscriber Validation System", by Epic Systems, Inc., 1982.
Brochure entitled "FSK Demodulator/Tone Decoder", dated Oct. 1976.
Brochure entitled "2732A 32K (4K×8) UV Erasable PROM", dated Aug. 1981, by Intel Corporation.
Brochure entitled "1024×8-Bit Static RAM for MCS-85", by Intel Corporation, 1980.
Brochure entitled "8031/8051/8751 Single-Component 8-Bit Microcomputer", by Intel Corporation, 1980.

Primary Examiner—Ulysses Weldon
Attorney, Agent, or Firm—Emrich & Dithmar

[57] ABSTRACT

A system provides for the validation of users of a trunked radio system. The system includes a controller and at least one microcomputer-controlled repeater module for user identification and validation. Each repeater module includes a tracking filter for removing unwanted noise from the two-tone signal sequentially transmitted by the user's radio as well as a digital signal processor utilizing a novel filter algorithm to quickly and reliably identify and validate user group tones. If identified as a valid user, the repeater module allows the call to pass. If the identity and validity, i.e., a paying customer, of the user are not validated by the repeater module, the repeater is shut down and the user is unable to communicate, and only hears alert tones from his speaker. A microcomputer in the repeater module performs a period measurement of the received two-tone sequence over a fixed interval, generates a histogram representing the period spread of the tone versus time over that fixed interval, calculates the mean of this histogram which represents the average period measured in accordance with the novel algorithm, and converts this average period into a tone number which is used to access a user validation table. Comparison of this tone number with the contents of the validation table results in either the shut down of the repeater in the case of an invalid user or the transmission of the received information to the appropriate receiver by the repeater. The present invention thus provides for the rapid and reliable identification and validation of system users and the denial of system access where appropriate.

5 Claims, 4 Drawing Figures

Microfiche Appendix Included
(25 Microfiche, 1 Pages)

SUBSCRIBER VALIDATION SYSTEM

This is a continuation of application Ser. No. 470,498, filed Feb. 28, 1983 now abandoned.

MICROFICHE APPENDIX

This application includes an Appendix entitled Table I in microfiche form which is a computer program listing printout comprised of a single microfiche sheet containing 25 frames.

BACKGROUND OF THE INVENTION

This invention relates generally to restricted access RF communications systems and is particularly directed to a means and method for identifying and validating individual users of a repeater-type trunked radio system.

Trunked RF communications systems typically utilize a repeater approach in which a central repeater is responsive to incoming calls for retransmission to a remote receiver. Incoming calls generally include a coded portion which uniquely identifies the caller and/or the party to whom the call is directed. Once the transmitted message is received, either the central repeater decodes and retransmits the message to the intended receiver or the remote receiver decodes the retransmitted message. This selective accessing approach may be accomplished by any number of conventional techniques. For example, the retransmitted signal may be coded so as to result in the call up of only the intended receiver.

In these limited access communications systems it is, of course, highly desirable to restrict usage to only intended, i.e., paying, customers. Thus, it becomes essential in such systems to know, and be able to grant system access to, those who are qualified to use the system. This requires a real-time system monitoring and control function which is capable of not only instantaneously determining who is a qualified user, but of also either denying or granting access to the system depending upon the status of the communicator, which status may change frequently. In addition, this monitoring and control function should be capable of handling a large number of users as repeater trunk communications are becoming increasingly popular and more widely accepted.

Prior art user validation systems generally utilize a simple frequency averaging technique involving adding several frequency measurements and dividing by the number of measurements. This approach results in limited system security and possible erroneous user validation. The present invention is intended to provide an improved subscriber validation system for a trunked repeater communications system in which user identity and eligibility for system use are rapidly and accurately determined by means of a unique means and method for detecting and validating a user's code in providing a high level of communications systems security. While intended for use with the GE-MARC V Trunked Mobile Radio System, the present invention is not limited in its scope to use with this system but has application to any conventional restricted access communications system.

SUMMARY OF THE INVENTION

Accordingly, the present invention contemplates a subscriber identification and validation system for a trunked mobile radio communications system. The present invention includes a controller and a plurality of daisy-chain coupled repeater modules. User identity and validation information is stored in a nonvolatile memory which serves as a "validity table" in the repeater module.

Subscriber identification and validation is accomplished by means of a respective repeater module, each of which is a self-contained digital signal processing unit which includes a unique signal filter arrangement for rapidly and reliably identifying collection and group tones which occur upon the initiation of a call. These tones are transmitted by a subscriber's radio in a two-tone sequence and are provided to a tracking filter in the repeater module to remove signal noise. The microprocessor-controlled repeater module then identifies and validates the subscriber by measuring the period between the two tones over a fixed time interval, generating a histogram over the measured time interval representing the period spread of the tone versus time, calculating the mean value of the histogram which represents the average period measured, and storing a tone number representing the average period in memory. Following tone transmission, the first and last tone numbers are recorded and combined into a random access memory (RAM) address and used to access a validation table. If the value read back is a "1", no action is taken and the communication link is established. If the value read back is "0", the repeater is shut down for a predetermined period during which the unauthorized mobile radio user will hear only alert tones in his speaker, while being unable to communicate.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 1A:
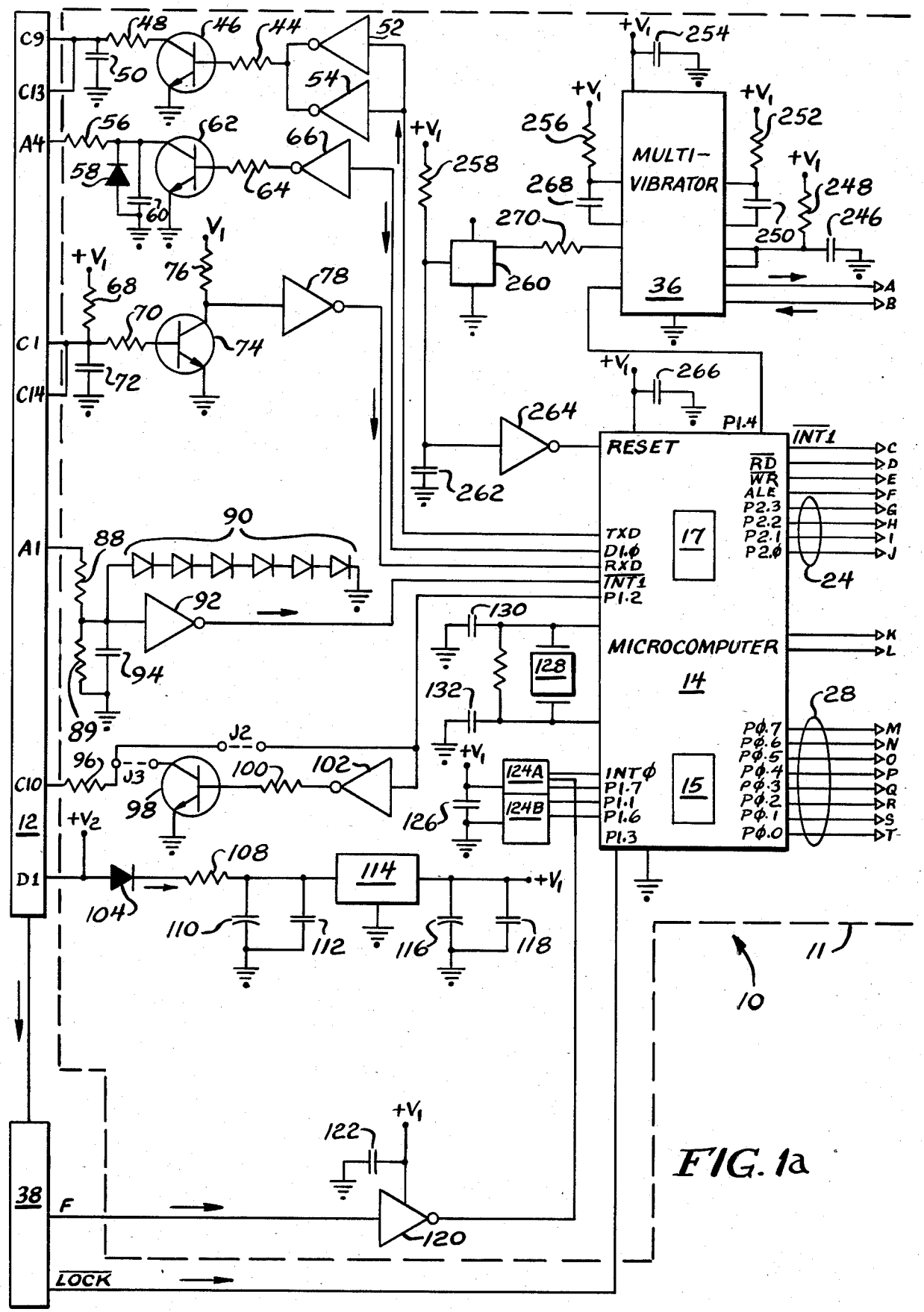
FIGS. 1a and 1b show, in combination, in schematic and block diagram form a subscriber validation system in accordance with the present invention.
Figure 1B:
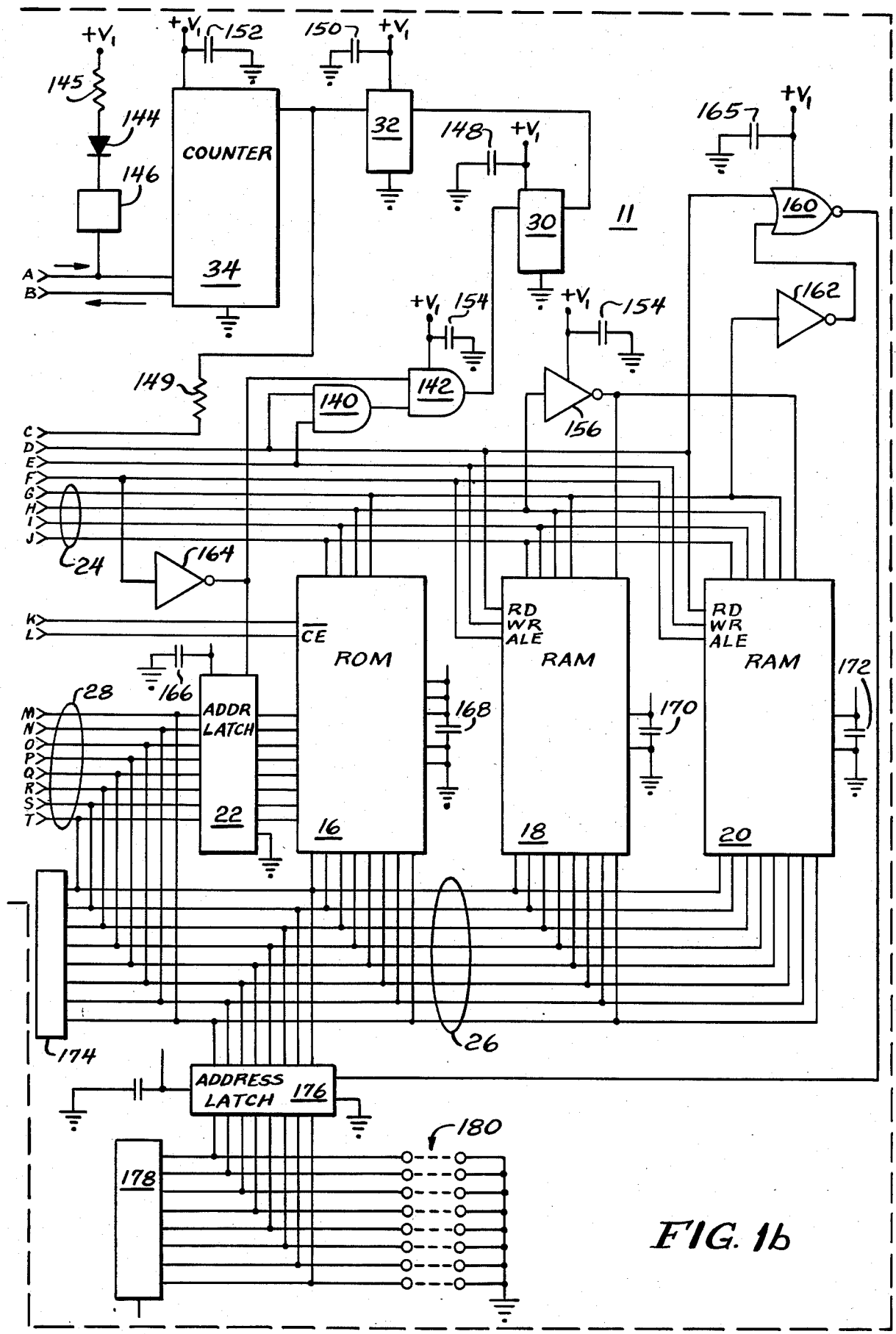

Referring to FIGS. 1a and 1b, there is shown partially in block diagram form and partially in schematic diagram form a subscriber validation system 10 in accordance with the present invention. With respect to FIGS. 1a and 1b, it should be noted that corresponding connections between the respective portions of the subscriber validation system shown in each of the figures are illustrated by common labels on arrow terminated lines designated by the letters A through T. The arrow terminations in each of the figures indicate that the connection transfers to a corresponding portion of the other figure. Thus, the arrowhead labeled "A" in the upper right hand corner of FIG. 1a is connected to the like labeled arrow terminated line in the upper left hand portion of FIG. 1b.

Briefly, the subscriber validation system 10 includes a repeater module 11, a communications system controller 12, and an audio signal processor 38. The repeater module 11 is controlled by a microcomputer 14 which receives an interrupt input from the system controller 12 indicating that a transmitter (not shown) has come up and will be transmitting its uniquely coded identifier signal shortly. The transmitted signal is then provided initially from the system controller 12 to an audio signal processor 38 for signal detection, acquisition and lock-on. This signal is a sequential two-tone signal having a characteristic period, or frequency. The first tone received is termed the "collect" tone while the second tone is termed the "group" tone. The combination of these two tones uniquely identifies the transmitter. Following filtering, acquisition and phase-lock in the audio signal processor 38, the received signal is then provided to microcomputer 14 where it undergoes a slotted period analysis in accordance with a program stored in erasable programmable read only memory (EPROM) or ROM, 16. In the analysis of the received signal, microcomputer 14 performs a period measurement for a fixed interval of time, during which each period is translated into an address within the storage array of random access memories (RAM's) 18, 20. At the end of the measurement interval, a curve in the form of a histogram is generated showing the period spread of the tone versus time of all periods sampled over the measurement interval. The mean of this histogram is then calculated, yielding the average period measured. A look-up table in ROM 16 is used to convert the average period into a tone number which is then stored in microcomputer 14. Upon the completion of the tone transmissions, the first and last stored tone numbers are combined into an address and used to access a validation table stored in RAM 18 or RAM 20. Although the present disclosure includes two RAM devices, it will operate equally well with only one RAM as the second RAM device merely provides additional memory to accommodate more users or additional peripheral functions. If the value read back from either RAM 18 or RAM 20 by microcomputer 14 is a "1", this indicates that the transmitter is a valid system user and no action is taken. If the value read back by repeater module 11 is a "0", the repeater module 11 is shutdown for a predetermined period, e.g., 4 seconds in a preferred embodiment, in denying the transmitting radio system access.

More specifically, the communications system controller 12 is connected to the repeater module 11 by a duplex serial bus which is daisy-chained from the system controller 12 to a plurality of repeater modules in serial fashion. Thus, although only one repeater module is shown in FIGS. 1a and 1b, the present invention contemplates daisy-chained linking between a plurality of repeater modules 11 with the system controller 12 in order to accommodate increased numbers of system subscribers. This daisy-chain arrangement is represented in FIGS. 1a and 1b by the connections between the system controller 12 and repeater module 11 as described below.

Power for the repeater module 11 is derived from the D1 pin of the communications system controller 12 in the form of a $+V_2$ direct voltage. The $+V_2$ input is then filtered by means of the parallel-coupled, grounded combination of capacitors 110, 112. The filtered $+V_2$ input is then provided to voltage regulator 114 for converting the $+V_2$ to a lower $+V_1$ value for providing the proper logic level voltage in repeater module 11. The $+V_1$ logic level voltage is filtered by the parallel-coupled, grounded combination of capacitors 116, 118. Diode 104 and resistor 108 provide protection for the system controller 12 from voltage reversals within repeater module 11. In a preferred embodiment of the present invention, $+V_2$ is $+13.8$ VDC, while $+V_1$ is $+5$ VDC. These two voltage levels are provided to various parts of the repeater module 11 for the operation thereof as explained in the following paragraphs.

Pins C1 and C14 of system controller 12 provide for the input of data which includes valid customer information to the repeater module 11. This customer data is provided via a filter network comprised of resistor 70 and grounded capacitor 72 to the base of NPN transistor 74. A $+V_1$ voltage is coupled across the base-collector junction of transistor 74 via current limiting resistors 68 and 76. The $+V_1$ pulls the input line up to a defined logic level or state, which state is then inverted by means of inverter 78 and provided to the RXD input of microcomputer 14. With system controller line logic positive, the input data signals are inverted to a negative level by transistor 74, the output of which is then re-inverted by means of inverter 78 so as to provide a positive logic input signal to the RXD input of microcomputer 14. System controller pin C14 is provided merely to illustrate the daisy-chain capability of the present system wherein a plurality of repeater modules may be serially coupled to system controller 12 for increasing the number of communications system subscribers. The subscriber information provided by the system controller 12 via pin C1 is provided by the microcomputer 14 to random access memory (RAM) devices 18, 20 in a manner described below.

Microcomputer 14 provides customer usage information for billing purposes to the communications system controller 12 via its TXD pin on the half duplex, 400 BAUD, ASCI encoded line. A customer usage data signal is provided from output pin TXD of microcomputer 14 to the parallel arrangement of inverters 52, 54, where the logic level is inverted and provided via biasing resistor 44 to the base of NPN amplifier transistor 46. The collector output from amplifier transistor 46 is filtered by means of the combination of resistor 48 and grounded capacitor and thence provided to the C9 input of system controller 12. Again, the C13 pin of system controller 12 is shown as serially coupled to the C9 pin thereof to illustrate the manner in which a plurality of repeater modules 11 may be daisy-chain coupled to the system controller. Such customer information as grade of service, such as whether the customer requires dial-to-pulse conversion, telephone interconnect and billing information may be stored in RAM's 18, 20 and read therefrom by microcomputer and provided to controller 12 as described.

As previously stated, if the value read back from the RAM's 18, 20 by microcomputer 14 is a "1", this indicates that the transmitter is a valid system user and no action is taken. If the value read back by microcomputer 14 is a "0", the repeater module 11 is shutdown for a predetermined period in denying the transmitting radio system access. The repeater disable line is coupled to the A4 output pin of controller 12. The repeater disable line is an active low control line to the D1.0 pin of microcomputer 14. If the received code does not provide a valid match with the user codes stored in RAM's 18, 20 as determined by microcomputer 14, microcomputer 14 clears its D1.0 port pin resulting in the saturation of NPN transistor 62 and the repeater disable line coupled to controller pin A4 is pulled low. This results in the disabling of repeater module 11 and the shutdown of the system's transmitter (not shown). Grounded diode 58 provides protection for NPN transistor 62 against the repeater disable line going from a positive to a negative voltage, while resistor 64 provides base drive and current limiting for NPN transistor 62. Resistor 56 and capacitor 60 form a filtering and buffering network while inverter 66 provides the necessary active low logic signal conversion for microcomputer 14.

A push-to-talk line couples output pin A1 of controller 12 to the interrupt ($\overline{INT1}$) input of microcomputer 14. Prior to receipt by the repeater module 11 of the two transmitted tones, a signal is provided from the A1 output pin of controller 12 which pulls the push-to-talk line high. This high state is converted to an active low signal by means of inverter 92 so as to provide the required logic level to the $\overline{INT1}$ interrupt pin of microcomputer 14. Following receipt of an input on its $\overline{INT1}$ input, microcomputer 14 prepares for the receipt and processing of the transmitted tone signals. Thus, an output from the A1 pin of controller 12 tells microcomputer 14 that a tone transmission has been made and that user identity and validation tones will be forthcoming. A voltage divider comprised of resistors 88 and 89 in combination with grounded, serially coupled diodes 90 reduces the input signal from 10 to 5 VDC, with grounded capacitor 94 providing input signal filtering.

An additional feature is provided in the present invention by connecting pin C10 of controller 12 with pin P1.2 of microcomputer 14. While not essential for the operation of the subscriber validation system 10, this connection provides for a half duplex serial link for the subscriber validation system 10 with a telephone communication system. An output signal from microcomputer 14 may be provided via either jumper J2 or jumper J3 from the P1.2 port of microcomputer 14 via resistor 96 to the C10 port of controller 12. The path associated with jumper J3 includes the serial combination of NPN transistor 98, resistor 100, and inverter 102 for providing an optional control line capable of driving an output device (not shown).

Two outputs are provided from audio signal processor 38 to microcomputer 14. These outputs are a signal F representing the frequency of the received tones and a $\overline{LOCK}$ signal which indicates that the audio signal processor 38 has locked onto a received tone. The frequency signal F is initially provided to inverter 120 and thence to a first divide-by-two circuit 124A for providing an accurate period measurement of the received tones to microcomputer 14. Dividing the signal by two insures that the signal has a 50% duty cycle which is required for true period measurement. Inverter 120 squares up the input frequency signal F. Capacitors 122 and 126 provide a signal filtering function. In a preferred embodiment the first, divide-by-two circuit 124A is coupled to a second divide-by-two circuit 124B where each of the divide-by-two circuits is a flip-flop circuit. The first flip-flop 124A provides a true period measurement to the timer circuit 15 within microcomputer 14 which measures the period of the received tone in microseconds in providing a true period measurement for determining tone frequency. In addition, flip-flop 124A also provides a divide-by-two signal to the second flip-flop 124B. The second flip-flop 124B provides an end of period signal to timer circuit 15 of microcomputer 14 indicating that one period measurement has been made and that the contents of the microcomputer's timer 15 can now be read and processed. The divide-by-two output from first flip-flop 124A is provided to the INT0 input pin of microcomputer 14, while divide-by-4 pulses are provided from the second flip-flop 124B to the P1.1 input of microcomputer 14 for providing an end of period signal to the timing circuitry therein. Reset signals are provided respectively from microcomputer pins P1.6 and P1.7 to first and second flip-flops 124A, 124B.

Figure 2:
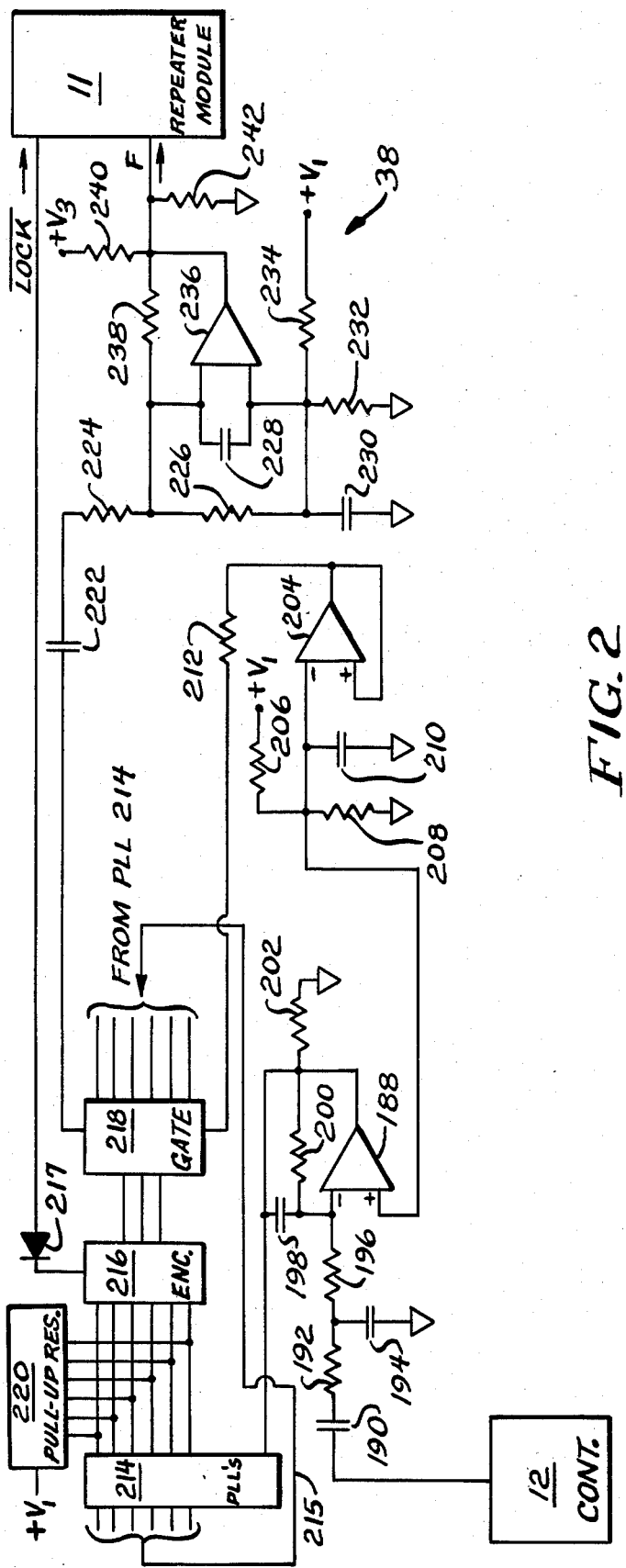
FIG. 2 shows in simplified block and schematic diagram form a received signal processing arrangement for use in the subscriber validation system of FIGS. 1a and 1b.

Referring to FIG. 2, there is shown in simplified block and schematic diagram form an audio signal processor 38 for use in a preferred embodiment of the present invention. The received tone signals are provided to audio signal processor 38 from communications system controller 12. The input stages of audio signal processor 38 include a filter network comprised of serially coupled capacitor 190 and resistor 192 and grounded capacitor 194. The thus filtered input audio signal is then provided via resistor 196 to one input of differential amplifier 188 for audio signal buffering. The parallel combination of capacitor 198 and resistor 200 filters out high frequency noise from the audio signal, while resistors 196 and 202 are selected for proper biasing of differential amplifier 188. The output of differential amplifier 188 is provided to phase locked loop (PLL) block 214.

In a preferred embodiment of the present invention, audio signal processor 38 includes six PLL's in parallel, to each of which is provided the received tone signals and each of which has a predetermined capture range. Thus, only one of the six PLL's will go into lock upon receipt of a tone signal depending upon the frequency of this signal. In FIG. 2, the six PLL's are shown as a single block 214 with six outputs representing outputs from each of the respective PLL's shown. Each PLL has a designated center lock frequency with a predetermined amount of bandwidth overlap between adjacent frequency PLL's. When one of the six PLL's in block 214 locks onto a received audio tone, a corresponding output line therefrom will go low. A pull-up resistor 220 connected to a $+V_1$ voltage source is coupled to each of the six output lines from the plurality of PLL's represented by block 214 such that when one of these lines goes low, a signal is provided to a priority encoder 216 from a respective one of the PLL's. Encoder 216 processes an input from one of the PLL's in PLL block 214 to generate a 3-bit coded output signal which is provided to analog gate 218. This 3-bit coded signal provided to analog gate 218 indicates that one of the respective PLL's in PLL block 214 has acquired and locked onto the received audio tone. In addition, priority encoder 216 provides a $\overline{LOCK}$ signal via diode 217 to the repeater module 11. Each of the PLL's in PLL block 214 is also coupled directly to analog gate 218 via line 215 to permit the PLL which has locked onto the received audio tone signal to provide that frequency to analog gate 218. Analog gate 218 thus performs a multiplexer function wherein the 3-bit coded signal provided by priority encoder 216 insures that the PLL output frequency from one of the six PLL's in PLL block 214 is gated through analog gate 218 to comparator 236.

In a preferred embodiment, analog gate 218 is comprised of several junction field-effect transistor (JFET) switches driven by complementary metal-oxide-silicon (CMOS) lines from the PLL block 214. Depending on the 3-bit code received from priority encoder 216, analog gate 218 will select one of the six analog inputs from PLL block 214 and output it to comparator 236. Analog gate 218 thus operates as an 8-position selector switch.

Referring back to differential amplifier 188, its positive input is coupled to a biasing network comprised primarily of differential amplifier 204. The output of differential amplifier 204 provides proper biasing for analog gate 218. The biasing network comprised primarily of differential amplifier 204 is maintained at a voltage approximately one-half of the $+V_1$ supply which is coupled to the negative input of differential amplifier 204 via resistor 206. Resistor 206 in combination with grounded resistor 208 and capacitor 210 forms a reference voltage source of approximately 2.5 VDC where $+V_1$ is 5 VDC.

The output signal from analog gate 218 representing the frequency of the received tone signal is filtered by the combination of capacitor 222 and resistor 224 and provided to analog comparator 236 for generating and providing the F frequency signal to the repeater module 11. The input to comparator 236 from analog gate 218 is compared with a reference voltage level provided to one input of comparator 236 by a $+V_1$ source which is divided-down by the combination of resistors 232 and 234. Filtering is provided by the combination of resistor 226 and grounded capacitor 230, while capacitor 228 provides isolation between the two inputs to comparator 236. A $+V_3$ is divided down by means of resistors 238 and 240 and is applied across comparator 236 for proper operation thereof, while resistor 242 provides filtering for the F frequency signal provided to repeater module 11. Comparator 236 operates to square-up the output from analog gate 218 into a 0–5 VDC signal. The output from comparator 236 is not a 50% duty cycle and thus not a good signal from which to determine frequency. This signal, shown as signal F which represents the frequency of the received audio tone, is thus provided to the combination of inverter 120 and divide-by-two circuit 124 for providing a signal to microcomputer 14 from which an accurate frequency determination may be made, as previously explained.

Initially, microcomputer 14 is provided with an indication that a transmitter in the system has been keyed and that transmitted audio tones are forthcoming. As previously described, this is accomplished via an output from the A1 terminal of communications system controller 12 which is provided to the $\overline{INT1}$ pin of microcomputer 14. Receipt of an input on its $\overline{INT1}$ pin causes microcomputer 14 to suspend its present operation and to stand by in a waiting mode for receipt of the incoming audio tones. These audio tones are initially processed in the audio signal processor 38, as previously described, and provided via divide-by-two circuit 124 to microcomputer 14. The two outputs from divide-by-two circuits 124A, 124B to microcomputer 14 represent the frequency of the received audio tone divided by two and a timing signal representing the end of a frequency measuring interval for allowing the contents of the microcomputer's timer 15 to be read and processed. Crystal oscillator 128 provides a timing reference signal to microcomputer 14 with capacitors 131, 132 insuring the start-up of the microcomputer's internal oscillator. The $\overline{LOCK}$ signal is provided from the priority encoder 216 of audio signal processor 38 via diode 217 to the P1.3 input pin of microcomputer 14 for indicating to the microcomputer that one of the PLL's has locked onto a received audio tone. This causes the program stored in microcomputer 14 to begin looking for the squared input thereto from the divide-by-two circuit 124A.

Following receipt of the F frequency signal from the audio signal processor 38, microcomputer 14 performs a frequency measurement routine in accordance with the program stored therein which is described in detail below. This period measurement is performed for approximately 200 milliseconds as determined by the period measurement signal provided from divide-by-two circuit 124 to microcomputer 14. Microcomputer 14 continues to process and measure the frequency of the received audio tones until both tones have been received at which time it combines the first and last frequency measurements into a signal representing an address in either random access memory (RAM) device 18 or 20. During the fixed interval of time in which the period of the incoming audio tone signal is measured, each measured period is translated into an address into one of the two RAM storage arrays 18, 20. The memory location corresponding to that address is sequentially incremented by 1 such that at the end of the measurement interval, a profile has been generated showing the period spread of the tone versus time. The resulting curve is a histogram of all periods sampled over the sampling interval. The mean of this histogram is then calculated under the control of the program stored in read only memory (ROM) 16, yielding the average period measured. Each period measurement is treated as an address in RAM's 18, 20. The location in RAM's 18, 20 pointed to by a given period measurement is incremented by 1 and is stored back in RAM. At the end of the measurement interval, a curve is generated which indicates how frequently various periods occurred, which curve is generally bell-shaped. The algorithm described in Table I then multiplies each RAM address by the number of occurrences and divides by the total number of periods measured. This provides an accurate measurement of the average period measurement. This average period measurement is then used to address a corresponding location in ROM 16. The microcomputer 14 then reads from ROM 16 a number corresponding to the average period measured. This number is termed the tone number and is referred to as the "Tone I.D." in the program listing of Table I. A look-up table in ROM 16 is then used to convert the average period into a tone number which is then stored in an internal memory in microcomputer 14. After the period of both received audio tones has been measured, the microcomputer 14 takes the first and last measurements, combines them into an address, accesses either RAM 18 or RAM 20, depending on where in the access table this address is, and reads the contents of that memory location which represents a validation bit for that received audio tone. If a "0" is read from either RAM 18 or RAM 20, microcomputer 14 pulls the repeater disable line coupled to pin A4 of the communications system controller 12 low which shuts down the repeater module 11 and disables the communications system transmitter (not shown). If a "1" is read from either RAM 18 or RAM 20, the repeater disable line coupled between pin A4 of communications system controller 12 and pin D1.0 of microcomputer 14 is not pulled low, the identity of the received audio tone is validated and a communications link is established between the transmitter which generated the audio tones and the desired receiver.

Address information is provided from microcomputer 14 via pins P0.0 through P0.7 on address/data bus 28 to an address latch 22 for accessing a selected portion of the operating program stored in ROM 16. This address information is similarly coupled to address latch 176 via address/data buses 28, 26 to permit the repeater module 11 to interface with various peripheral devices. A plurality of jumper wires, or straps, 180 may be used to couple the address latch 176 to a peripheral device (not shown) for providing each repeater module with a unique identifier code. Pull-up resistive networks 174, 178 are coupled in a conventional manner to data/address buses 28, 26, respectively. Data is provided to microcomputer 14 from ROM 16 and RAM's 18, 20 via address/data buses 26, 28 to pins P0.0 through P0.7 of microcomputer 14. Timing capacitors 166, 168, 170 and 172 are respectively coupled to address latch 22, ROM 16 and RAM's 18, 20 for providing proper timing therein.

Higher level addressing for ROM 16 and RAM's 18, 20 is provided by a higher level address bus 24 comprised of the outputs from pins P2.0 through P2.3 of microcomputer 14. The address information output from microcomputer 14 via pins P2.0 through P2.3 determines which memory bank of 256 locations each is to be accessed in ROM 16 and RAM's 18, 20. In response to accessing of a particular address in ROM 16 by microcomputer 14, ROM 16 releases an operation code which is provided to microcomputer 14 for the execution of a desired routine. Upon completion of this routine, microcomputer 14 accesses ROM 16 with another address instruction and the process continues until the operating program within microcomputer 14 is completed. The ALE (Address Latch Enable) output from microcomputer 14 indicates to address latch 22 and RAM's 18, 20 when address or data information is being provided via the P2.0 through P2.3 output pins of microcomputer 14. When the ALE is high, the aforementioned outputs contain address information. When the ALE line is low, data is being output by the P2.0 through P2.3 lines. The ALE output from microcomputer 14 thus indicates to address latch 22 when to latch data in RAM's 18, 20. Inverter 164 couples the ALE line from microcomputer 14 to address latch 22 for providing proper logic level thereto. $\overline{RD}$ and $\overline{WR}$ represent respectively the read and write control outputs from microcomputer 14. Both of these outputs are provided to RAM's 18, 20 depending upon whether microcomputer 14 desires to write data or address information into either of these RAM's to read data from a RAM device. In a preferred embodiment, each of the RAM devices 18, 20 include an internal address latch thus requiring the ALE input thereto from microcomputer 14.

The $\overline{RD}$ and $\overline{WR}$ outputs from microcomputer 14 are provided to AND gate 140, the output of which is provided to one input of AND gate 142. To the other input of AND gate 142 is provided the ALE output from microcomputer 14. AND gates 140, 142 combine the $\overline{RD}$, $\overline{WR}$, and ALE outputs from microcomputer 14 to form a steady clock signal at 2 MHz by means of standard combinatorial logic, with grounded capacitor 154 in combination with the $+V_1$ source providing a filtered input voltage thereto. Divide-by-two flip-flop 30 converts the 2 MHz output from AND gate 142 to a 1 MHz clocking signal which is provided to a 14-bit CMOS binary counter 32 which divides the 1 MHz input thereto by 4096 in generating an output of 488 Hz. Microcomputer 14 periodically reads the 488 Hz output from binary counter 32 and utilizes this signal as a time base reference for accumulating, or measuring, time. Microcomputer 14 converts the 488 MHZ input to its $\overline{INT1}$ pin to a 1 MHZ signal for driving a second timer, or counter, circuit 17 therein. The 488 Hz output from binary counter 32 is further divided by binary counter 34 so as to produce and provide a 30 Hz output to 1-shot multivibrator 36.

Microcomputer 14 constantly toggles under the control of its operating program the output from pin P1.4 to multivibrator 36. This line coupling microcomputer 14 with multivibrator 36 periodically goes high and low under the operating program of microcomputer 14 and indicates to multivibrator 36 that the operating program is functioning properly. The toggled output from pin P1.4 of microcomputer 14 is provided via multivibrator 36 to counter 34 for periodically clearing this counter if the operating program in microcomputer 14 is functioning properly. If the operating program in microcomputer 14 malfunctions, counter 34 will time out since it is no longer receiving reset pulses from multivibrator 36 and will provide a pulse to the other half of one-shot multivibrator 36. In response to the pulse received from counter 34, one-shot multivibrator 36 will provide an output pulse of 20–30 microseconds to buffer driver 260 and inverter 264 for resetting microcomputer 14 for restoring normal operation therein. Thus, in the present invention the $\overline{RD}$, $\overline{WR}$ and ALE outputs from microcomputer 14 are used to generate a clock signal which, in turn, is used to monitor the operation of the software program in microcomputer 14 and provide a reset signal thereto in the event of a software program malfunction. This feature provides protection against the software routine in microcomputer 14 from entering a faulty operating mode and generating invalid data in the subscriber validation system of the present invention.

Timing capacitors 148, 150 and 152 in combination with the $+V_1$ source are respectively coupled to flip-flop 30 and binary counters 32, 34. Light emitting diode (LED) 144 coupled via resistor 145 to the $+V_1$ source provides a visual indication of the proper operation of the microcomputer software program. A conventional driver circuit 146 couples LED 144 to the software status monitoring line coupling multivibrator 36 to binary counter 34. Multivibrator 36 in a preferred embodiment is one-half of a one-shot multivibrator with the combinations of resistor 256, capacitor 268, and resistor 252, capacitor 255, and resistor 248, capacitor 246 providing proper timing for one-shot multivibrator 36. The toggled output provided from pin P1.4 of microcomputer 14 to multivibrator 36 results in the transmission of a narrow pulse from multivibrator 36 to counter 34. This narrow pulse is provided to binary counter 34 only if the software operation of microcomputer 14 is functioning properly. Upon a software malfunction, counter 34 is no longer reset by the pulsed output from multivibrator 36 and, as a result, will time out and provide a pulse to the other half of multivibrator 36. In response to this input pulse, multivibrator 36 will generate an output pulse which turns on driver circuit 260 resulting in the discharge of capacitor 262 and a reset pulse being provided via inverter 264 to the RESET input bit of microcomputer 14.

The $\overline{RD}$ output from microcomputer 14 selects which of the RAM devices 18, 20 is to provide data back to the microcomputer. Similarly, the P2.2 and P2.3 outputs from microcomputer 14, in combination with inverter 156 determine which of the RAM devices 18, 20 is powered up depending upon the address put out by microcomputer 14 on higher order address bus 24 from output pins P2.0 through P2.3. The combination of inverter 162 and NOR gate 160 operate as an address decoder for providing address information to address latch 176 to permit the subscriber validation system 10 to interface with other communications systems such as a conventional telephone system.

In a preferred embodiment of the present invention, microcomputer 14 is an 8031 single-component 8-bit microcomputer available from Intel Corporation. RAM devices 18, 20 in a preferred embodiment are 8185 static random access memories organized as 1024 words by 8-bits using N-channel silicon-gate MOS technology and ROM 16 is a 2732A 32K UV erasable programmable read only memory (PROM), both of which are also available from Intel Corporation. The phase-locked loop (PLL) 214 utilized in a preferred embodiment of the present invention is the XR-2211 FSK demodulator-tone decoder.

Figure 3:
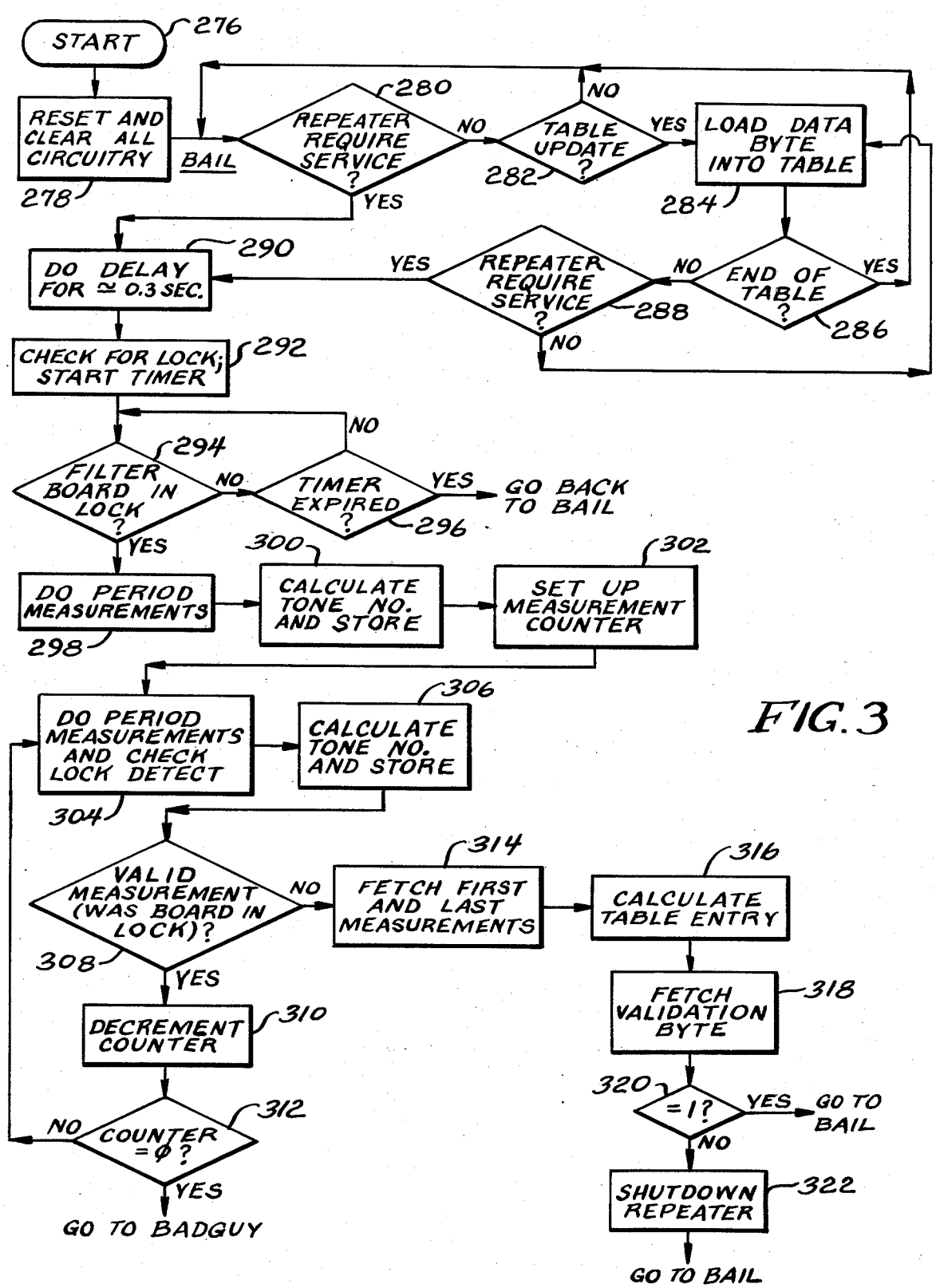
FIG. 3 illustrates the sequence of operations carried out in the subscriber validation system of FIG. 1 under the control of a microcomputer.

Referring to FIG. 3, there is shown the manner in which digital signals are processed in the subscriber validation system 10 of the present invention in identifying and validating the identity of system subscribers and either providing or restricting access to the communications system in response to this identification and validation. Referring to FIG. 3, an oval symbol indicates the start of an operational sequence, a rectangle indicates an instruction or set of instructions resulting in the performance of a control function, and a diamond indicates a decision point based upon the comparison of binary signal inputs. Also provided as Table I is the detailed program listing utilized in carrying out the operations indicated in FIG. 3.

After power is applied to the subscriber validation system 10 and the system is turned on, the program in microcomputer 14 executes a start routine at step 276 which involves the resetting of flags therein and the initialization of conditions to a predetermined state as shown in step 278. The program then executes an idle routine designated "BAIL" which initially involves an inquiry as to whether the repeater module 11 requires service at step 280. If the repeater module 11 does not need to be serviced indicating that no incoming call has been received, the program next checks with the system controller 12 to see if the user table as stored in RAM's 18, 20 needs to be updated. If these subscriber tables need to be updated, the new data is provided thereto at step 284 and the program next checks to see if the end of the RAM table has been reached at step 286. If the end of the table has been reached, the program returns to the main program, but if the end of the table has not been reached, the program checks to see if the repeater module needs to be serviced in response to an incoming call at step 288 and if an incoming call has been received it returns to the main program at step 290. If an incoming call has not been received, the program continues updating the user table in RAM's 18, 20 until the end of the table is reached at which time the program returns to the main program.

Following return to the main program at step 290, a built in delay of approximately 0.3 seconds is provided, followed by a check for receipt of the lock signal from a PLL 214 and the start of microcomputer timing at step 292. The program next checks to see if the audio board is in lock with a received tone signal at step 294 and if lock has not been acquired within a predetermined time period as provided at step 296, the program re-executes an audio filter board lock detection routine at step 294 again. When PLL lock is detected in step 294, the program proceeds to step 298 for executing a period measurement for the first received tone, or the collect tone, in response to the receipt by microcomputer 14 of the F frequency and $\overline{\text{LOCK}}$ signals from the audio signal processor 38 as previously explained. Following a period measurement, the program calculates a first tone number using ROM 16 and stores this first tone number in microcomputer 14 as previously described at step 300 and initializes counter 15 in microcomputer 14 at step 302. The program then does a series of period measurements of the second received tone, or the group tone, over a predetermined interval as previously described and checks for receipt of the lock detect signal as shown in step 304. This series of period measurements is accomplished by the loop represented by steps 304, 306, 308, 310 and 312. A second tone number corresponding to the measured period, or frequency, of the second received tone is then generated and stored in microcomputer 14 at step 306 and a valid measurement check is performed by insuring that the audio signal processor 38 is phase-locked with a received audio tone. If a valid measurement is detected, the microcomputer's counter is decremented by 1 at step 310 until the counter reads 0 at which time the repeater is activated and the communications link is established between the caller and a desired receiver following step 312. The microcomputer's internal RAM (not shown) includes a preset location which allows the maximum number of total period measurements to be made and the maximum number of tone numbers to be generated. The maximum number of tone numbers generated is 12.

If a valid measurement is not detected at step 308, the program then recalls the first and last measurements at step 314, calculates a RAM table entry at step 316 and receives the corresponding validation bit from one of the RAM devices at step 318. If the value read back is a "1" at step 320, no action is taken and the repeater is activated for establishing a communications link between the caller and the intended receiver. If the value read is a "0", the repeater is shut down for four seconds forcing the radio off that channel and denying communications system access to the transmitter.

While particular embodiments of the present invention have been shown and described, it will be obvious to those skilled in the art that changes and modifications may be made without departing from the invention in its broader aspects and, therefore, the aim in the appended claims is to cover all such changes as fall within the true spirit and scope of the invention. The matter set forth in the foregoing description and accompanying drawings is offered by way of illustration only and not as a limitation. The actual scope of the invention is intended to be defined in the following claims when viewed in their perspective based on the prior art.

I claim:

1. In a restricted access trunked RF communication network including a central controller and a repeater module for exercising control over said network in re-transmitting a signal received from an authorized user transmitter wherein said received signal includes identifier tones for uniquely identifying a transmitter as a valid network user and wherein said identifier tones are at the beginning of said received signal, a system for validating network users comprising:

audio signal processor means coupled to the central controller and responsive to the identifier tones in the received signal for acquiring and locking onto the received signal, wherein said audio signal processor means provides a first output signal representing the period of a received identifier tone and a second output signal indicating that said audio signal processor means has received and locked onto a receiver identifier tone;

timing means coupled to said audio signal processor means and responsive to said second output signal for generating a timing signal of predetermined length in response to the receipt of said received signal;

measuring means coupled to said audio signal processor means and responsive to said first output signal for measuring the period of each of said identifier tones and providing a third output signal representing the period of each of said identifier tones;

processing means coupled to said timing means and to said measuring means and responsive to said timing signal and third output signal respectively output therefrom for averaging the measured periods of said identifier tones over the duration of said timing signal and generating an average period value for each of said identifier tones;

conversion means coupled to said processing means for converting the averge period values of a first measured period and a last measured period to a tone number representing a memory address and for providing said tone number to said processing means; and memory means coupled to said processing means for storing valid user information in a plurality of memory locations therein, wherein said processing means accesses a memory location in said memory means in naccordance with the tone number provided to said processing means by said conversion means and wherein said processing means enables said repeater module if said tone number corresponds with said valid user information and disables said repeater module if said tone number does not correspond with said valid user information.

2. A network validation system in accordance with claim 1 wherein said received signal includes two identifier tones for uniquely identifying a transmitter as a valid network user.

3. A network user validation system in accordance with claim 1 wherein said audio signal processor means includes tracking filter means for removing noise from said received signal.

4. A network user validation system in accordance with claim 3 wherein said tracking filter means includes a plurality of phase-locked loops with each phase-locked loop having a center frequency and a predetermined capture range and wherein the capture ranges of adjacent phase-locked loops overlap in frequency a predetermined amount.

5. A network user validation system in accordance with claim 4 further including a digital encoder coupled to said phase-locked loops for encoding the respective phase-locked loop outputs and generating said second output signal indicating that one of said phase-locked loops is locked onto a received identifier tone and further including an analog gate coupled to said phase-locked loops and said digital encoder for generating said first output signal representing the period of a received identifier tone.

* * * * *

UNITED STATES PATENT AND TRADEMARK OFFICE
CERTIFICATE OF CORRECTION

PATENT NO.   : 4,626,845
DATED        : December 2, 1986
INVENTOR(S)  : John F. Ley It is certified that error appears in the above—identified patent and that said Letters Patent is hereby corrected as shown below:

Column 13, line 26, "averge" should be -- average --.

Column 14, line 1, "naccordance" should be -- accordance --.

Signed and Sealed this

Seventh Day of April, 1987

Attest:

DONALD J. QUIGG

Attesting Officer

Commissioner of Patents and Trademarks